(No Model.)
C. W. & W. C. COLLYER.
COMBINED WIRE CUTTER AND SAW.
No. 358,544. Patented Mar. 1, 1887.
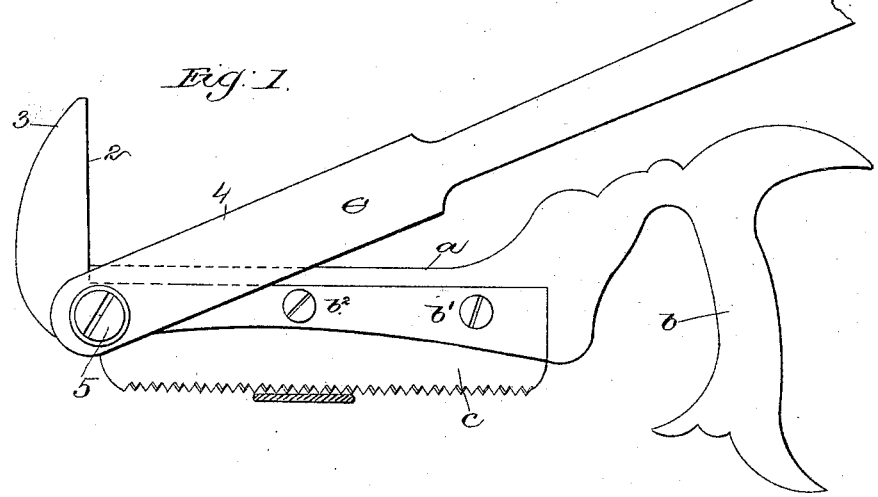
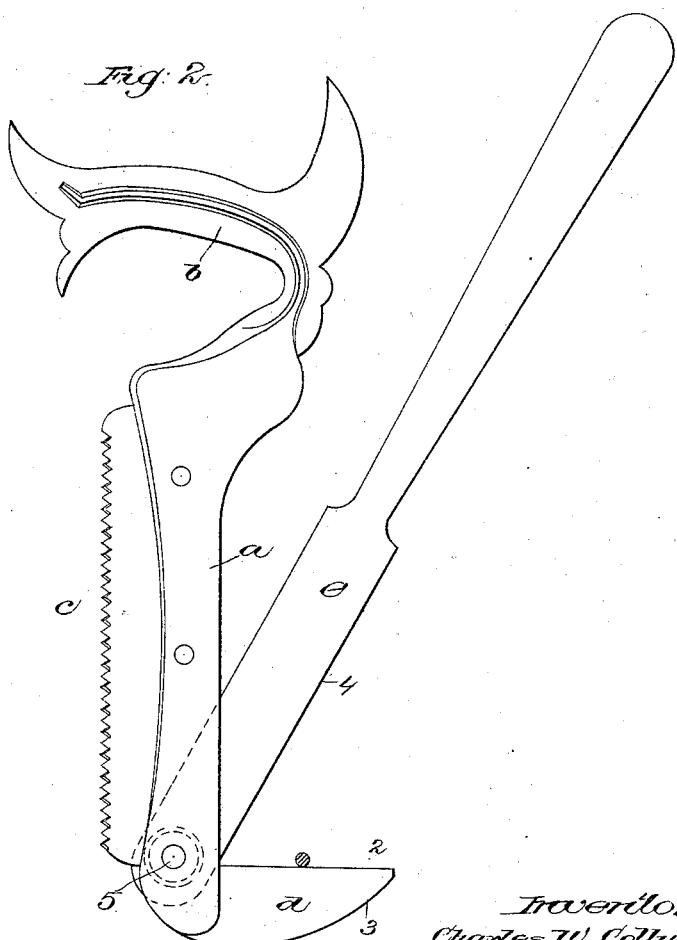
Witnesses.
Fred L. Emery
John F. C. Brinkert
Inventors.
Charles W. Collyer
William C. Collyer
By Crosby & Gregory Attys

UNITED STATES PATENT OFFICE.

CHARLES W. COLLYER AND WILLIAM C. COLLYER, OF LYNN, MASS.

COMBINED WIRE-CUTTER AND SAW.

SPECIFICATION forming part of Letters Patent No. 358,544, dated March 1, 1887.

Application filed June 29, 1886. Serial No. 206,592. (No model.)

*To all whom it may concern:*

Be it known that we, CHARLES W. COLLYER and WILLIAM C. COLLYER, of Lynn, county of Essex, and State of Massachusetts, have invented an Improvement in a Combined Saw and Wire-Cutter, of which the following description, in connection with the accompanying drawings, is a specification, like letters on the drawings representing like parts.

This invention has for its object to construct a combined saw and wire-cutter especially designed for opening bales of cotton, hay, &c., some of which are tied with wire and others with wooden and iron bands.

In accordance with this invention the saw-frame having any suitable or usual handle and blade is provided at that end opposite the handle with a pointed projection extending at an angle with relation to the frame, one edge of the said projection being straight and the other curved, a cutting-lever pivoted to the saw-frame near the junction of the said frame and projection co-operating with the straight edge of the said projection to constitute a cutter for the wire or band.

To open bales of hay, straw, or other material tied with wire, the projection is forced beneath the wire and the cutting-lever turned on its pivot, carrying the straight edge of the projection; but to open such bales as may be tied with wooden or iron bands the saw may be employed.

Figure 1 in side elevation shows our improved device in position to cut the wooden or iron bands, the saw being used; and Fig. 2, a side elevation of the device in position to cut a wire.

The saw-frame $a$, having any suitable handle, $b$, has secured to it by screws, rivets, or other suitable fastenings, $b'$, a blade, $c$, preferably having back teeth. A pointed projection, $d$, is secured to the frame $a$ at that end opposite the handle $b$, or it may form a part of said frame, extending at an angle with relation thereto. The projection $d$ has a straight edge, 2, and a curved edge, 3, for purposes to be described.

A lever, $e$, having a straight edge, 4, is pivoted at 5 to the end of the saw-frame opposite the handle $b$, the straight edge 4 of the said lever co-operating with the straight edge 2 of the projection, constituting a wire-cutting device; but the said blade and projection may be used to cut off a narrow metal band.

In opening bales of hay, straw, cotton, &c., tied with wooden or iron bands, the saw will be employed, and in opening such bales as may be tied with wire the projection $d$ is forced beneath the wire, the curved edge 3 permitting such result to be effected. The lever $e$ will then be turned on its pivot and the wire, acted upon by the two straight edges 2 4, will be cut.

The edges 2 4 are preferably somewhat beveled in the direction of their length, to facilitate the severance of the wire.

It is obvious that the implement herein described may be somewhat modified in its construction without departing from the essential features of our invention.

We claim—

As an improved article of manufacture, a saw composed of a frame, handle, and blade, said frame having at the end thereof opposite to the said handle the tapering projection $d$, extending at right angles, or approximately so, to the body of the frame, combined with the cutting-lever $e$, pivoted to said frame near said projection, substantially as set forth.

In testimony whereof we have signed our names to this specification in the presence of two subscribing witnesses.

CHARLES W. COLLYER.
WILLIAM C. COLLYER.

Witnesses:
BERNICE J. NOYES,
F. CUTTER.